US011693559B2

(12) United States Patent
Zhao et al.

(10) Patent No.: US 11,693,559 B2
(45) Date of Patent: Jul. 4, 2023

(54) DYNAMIC OBJECT POLICY RECONFIGURATION MECHANISM FOR OBJECT STORAGE SYSTEM

(71) Applicant: VMware, Inc., Palo Alto, CA (US)

(72) Inventors: Xiaoou Zhao, Shanghai (CN); Peng Dai, Acton, MA (US); Ye Zhang, Shanghai (CN); Gourav Kumar Sakargayan, Cupertino, CA (US); Asit Desai, Cupertino, CA (US); Varun Shah, Fremont, CA (US); Wangping He, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 37 days.

(21) Appl. No.: 17/212,125

(22) Filed: Mar. 25, 2021

(65) Prior Publication Data
US 2022/0308759 A1    Sep. 29, 2022

(51) Int. Cl.
*G06F 3/00* (2006.01)
*G06F 3/06* (2006.01)

(52) U.S. Cl.
CPC ............ *G06F 3/0604* (2013.01); *G06F 3/067* (2013.01); *G06F 3/0629* (2013.01)

(58) Field of Classification Search
None
See application file for complete search history.

(56) References Cited

U.S. PATENT DOCUMENTS 6,201,652 B1 * 3/2001 Rezzi ................. G11B 27/3027
2016/0335144 A1 * 11/2016 Cai ..................... G06F 11/0754

* cited by examiner

*Primary Examiner* — Midys Rojas
(74) *Attorney, Agent, or Firm* — Dinsmore & Shohl LLP

(57) ABSTRACT

A method for dynamic storage object configuration in a datacenter is provided. Embodiments include determining a number of fault domains in a storage cluster that have sufficient storage capacity for creating a storage object. Embodiments include applying a dynamic fault tolerance policy to the number of fault domains that have sufficient capacity for creating the storage object in order to determine a number of host failures to tolerate for the storage object, the dynamic fault tolerance policy specifying a manner of determining, for any respective storage object, a respective number of host failures to tolerate for storing the respective storage object in a respective storage cluster based on at least a respective number of fault domains of the respective storage cluster. Embodiments include implementing the storage object on the storage cluster based on the number of host failures to tolerate for the storage object.

20 Claims, 6 Drawing Sheets

Dynamic Fault Tolerance Policy
310

$$HFT = \begin{cases} 0, & n = 0 \\ (n-1)/2, & 0 \leq n < 7 \\ 3, & n \geq 7 \end{cases}$$

Figure 3

| Operation | Number of Fault Domains | Number of Fault Domains with Sufficient Capacity | HFT of the Object |
|---|---|---|---|
| Add 2 hosts to cluster | 5 | 3 | 1 |
| Include resources of newly added hosts in cluster | 5 | 5 | 2 |
| Add 2 hosts to the cluster | 7 | 5 | 2 |
| Include resources of newly added hosts in cluster | 7 | 7 | 3 |
| Configure 7 hosts into 3 different fault domains | 3 | 3 | 1 |
| Clear fault domain configuration | 7 | 7 | 3 |
| Remove resources of one host from cluster | 7 | 6 | 2 |
| Enter maintenance mode for above host | 6 | 6 | 2 |
| Enter maintenance mode for one host | 5 | 5 | 2 |
| Enter maintenance mode for one host | 4 | 4 | 1 |
| Enter maintenance mode for one host | 3 | 3 | 1 |
| Enter maintenance mode for one host | 2 | 2 | 0 |
| Enter maintenance mode for one host | 1 | 1 | 0 |

DYNAMIC OBJECT POLICY RECONFIGURATION MECHANISM FOR OBJECT STORAGE SYSTEM

BACKGROUND

Distributed systems allow multiple clients in a network to access a pool of shared resources. For example, a distributed storage system, such as a distributed virtual storage area network (vSAN) datastore, allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines, spawned on the host computers may use the datastore, for example, to store objects (e.g., virtual disks) that are accessed by the virtual machines (VMs) during their operations.

A hyper-converged infrastructure (HCI) is a software-defined infrastructure in which the traditional three-tier infrastructure (i.e., compute, storage, and networking) is virtualized in order to reduce complexity and, at the same time, increase scalability. For example, an HCI datacenter, in which storage, compute, and networking elements of the datacenter are virtualized, has significantly higher scalability and less complexity, compared to a conventional (or hardware-defined) datacenter. In an HCI datacenter, an application may run on several different virtual machines or other types of virtual computing instances (VCIs), such as containers, etc.

A VCI may include one or more objects (e.g., virtual disks) that are stored in an object-based datastore (e.g., vSAN) of the datacenter. Each object may include one or more components depending on the storage policy that is defined (e.g., by an administrator) for the object. For example, based on a storage policy that requires high availability for an object, the datastore may define two or more components for the object that are mirrors of each other and distributed across different hosts (e.g., servers). Conversely, if a storage policy requires higher performance, the datastore may specify two or more components for the object that are distributed across different disks. A component may be a part of, or portion of, an object. The different components of an object, also referred to as "object components," may be stored in different storage resources (e.g., one or more physical disks of one or more host machines) of the datastore.

Objects may be associated with fault tolerance policies indicating an extent to which objects are to be tolerant of host failures. A fault tolerance policy may, for example, indicate a number of host failures to tolerate (HFT), meaning that an object must be implemented in such a way as to guarantee data access even in the event that a certain number of hosts fail. Generally, objects including sensitive data will be assigned a higher number of HFT. As changes occur in a vSAN, such as the addition of new hosts, a user may wish to modify the HFT of an object, such as to increase the HFT for better protection. However, existing techniques for policy reconfiguration has certain limitations. Firstly, existing techniques involve manual reconfiguration of policies, and manual reconfiguration does not scale well in larger data centers. Secondly, some objects are not exposed to the user, such as metadata objects used to store certain configuration and domain information, and so the user is unable to change policies for these objects using existing techniques. Accordingly, there is a need in the art for improved techniques of policy management for object storage systems.

BRIEF DESCRIPTION OF THE DRAWINGS

FIG. 3 is an illustration of a dynamic fault tolerance policy, according to an example embodiment of the present application.

FIG. 4 is a diagram illustrating application of a dynamic fault tolerance policy in response to certain events, according to an example embodiment of the present application.

DETAILED DESCRIPTION

Figure 1:
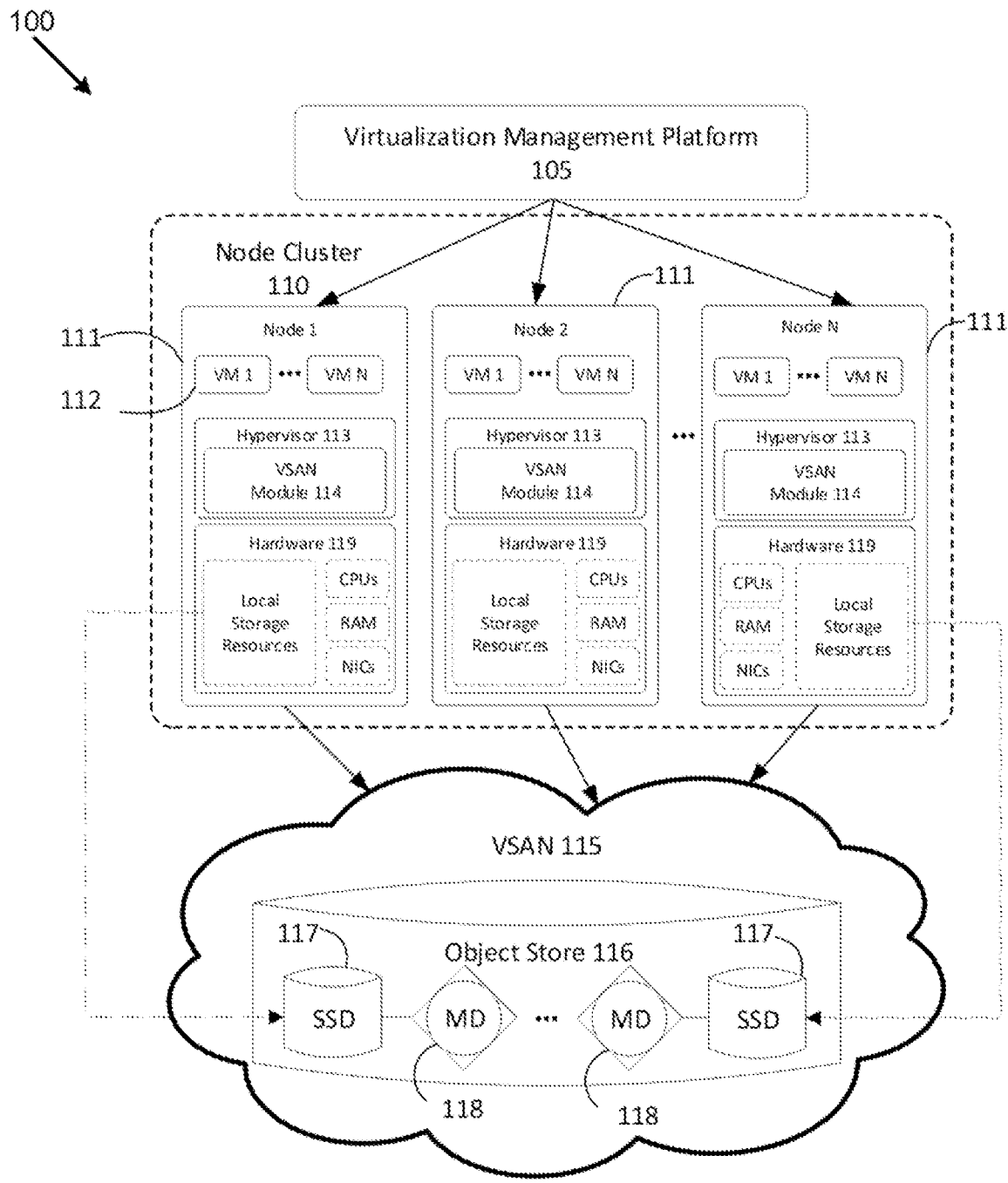
FIG. 1 is a diagram illustrating an example computing environment in which embodiments of the present application may be practiced.

In a distributed object-based datastore, such as vSAN, objects (e.g., a virtual disk of a VM stored as a virtual disk file) are associated with storage policies that specify various requirements such as fault tolerance requirements for the objects. In order to allow objects to be adapted to changing circumstances, such as the addition and removal of hosts in a vSAN, techniques described herein involve dynamic fault tolerance policies for objects. As will be described in more detail below, a dynamic fault tolerance policy specifies a manner by which a number of host failures to tolerate (HFT) is determined for an object based on dynamic conditions.

In one embodiment, a dynamic fault tolerance policy specifies that the HFT for an object is to be determined based on how many fault domains in a given storage cluster have sufficient capacity for creating the object. A storage cluster generally refers to a cluster of host computers that together form a single and shared pool of storage. A fault domain can generally be described as a set of host computers in a data center (or data centers) that share a number of specified attributes and/or characteristics that results in a higher probability of failure of host computers in the fault domain upon a failure of one of the host computers in the fault domain. The attributes and/or characteristics utilized by an enterprise to define its data center fault domains depend upon the type of disasters and the level of recovery that the enterprises desire to achieve. For example, an enterprise may choose to define its fault domains based upon the physical proximity of host computers (storage rack location, geographic locations, etc.), the dependency of such host computers on shared hardware (networked storage, power sources, physical connections, etc.) or software technologies (shared file systems, etc.), and the like. A well-constructed fault domain minimizes the correlation of a failure of a VCI in one fault domain with the failure of another VCI in a different fault domain. In one example, a fault domain may comprise all host computers in a single rack. In another example, a fault domain may comprise a single host computer. A fault domain is determined to have sufficient capacity to create a storage object if the fault domain contains enough available storage resources to store the contents of the storage object.

A storage object may be created on a storage cluster according to a dynamic fault tolerance policy such that a number of replicas of the storage object satisfies a number of HFT determined for the storage object based on the dynamic fault tolerance policy. As will be discussed in detail below, in some embodiments, a storage object may be deployed as a redundant array of independent disks (RAID) tree, in which each leaf of the tree may be a component of the object. A stripe width of a storage object may define the number of individual disks (or stripes) per object. If a storage policy defined for a virtual disk file includes a stripe width of 2 and an HFT of 0, a RAID-0 stripe may be configured for the virtual disk file across a minimum of two individual disks. In this example, the virtual disk file may be the object, and each of the stripes may be a component of that object. As another example, if the storage policy specifies, for a virtual disk file, an HFT of 1 in a storage cluster, with a stripe width of 1, a RAID-1 mirror for the virtual disk file object may be created with one (mirror) component on one host computer of the cluster and another (mirror) component on a different host computer of the cluster.

A dynamic fault tolerance policy is evaluated at the time of object creation to determine an HFT for the object, and the HFT is implemented when the object is created, such as by creating zero or more replicas of the object. In some embodiments, a dynamic fault tolerance policy is also evaluated on an ongoing basis as changes occur in the storage cluster so that the HFT can be updated based on changing conditions. For example, if a host is added to or removed from the storage cluster, a dynamic fault tolerance policy for an object in the storage cluster may be re-evaluated to determine an updated HFT for the storage object based on the updated number of hosts. The updated HFT may then be implemented, such as by adding or removing replicas of the storage object in the storage cluster.

A dynamic fault tolerance policy may be associated with an individual object or may be associated with multiple objects, such as all objects of a certain type. In some embodiments, a default dynamic fault tolerance policy may be defined, and the default dynamic fault tolerance policy may be applied to all objects for which another more particular dynamic fault tolerance policy has not been defined. Dynamic fault tolerance policies may be applied even to objects that are not exposed to the user, thus allowing these objects to be stored in an optimal fault tolerant manner without requiring manual review and modification of the objects' configuration data by the user.

It should be noted that although the disclosure is described mostly with reference to VMs, the embodiments described herein may also apply to other types of virtual computing instances (VCIs), such as containers, Docker containers, data compute nodes, isolated user space instances, namespace containers, physical computing devices, and the like.

FIG. 1 is a diagram illustrating an example computing environment 100 in which embodiments of the present application may be practiced. As shown, computing environment 100 includes a distributed object-based datastore, such as a software-based "virtual storage area network" (vSAN) environment that leverages the commodity local storage housed in or directly attached (hereinafter, use of the term "housed" or "housed in" may be used to encompass both housed in, or otherwise directly attached) to host machines/servers or nodes 111 of a storage cluster 110 to provide an aggregate object store 116 to virtual machines (VMs) 112 running on the nodes. The local commodity storage housed in the nodes 111 may include one or more of solid state drives (SSDs) or non-volatile memory express (NVMe) drives 117, magnetic or spinning disks or slower/cheaper SSDs 118, or other types of storages.

In certain embodiments, a hybrid storage architecture may include SSDs 117 that may serve as a read cache and/or write buffer (e.g., also known as a performance/cache tier of a two-tier datastore) in front of magnetic disks or slower/cheaper SSDs 118 (e.g., in a capacity tier of the two-tier datastore) to enhance the I/O performances. In certain other embodiments, an all-flash storage architecture may include, in both performance and capacity tiers, the same type of storage (e.g., SSDs 117) for storing the data and performing the read/write operations. Additionally, it should be noted that SSDs 117 may include different types of SSDs that may be used in different layers (tiers) in some embodiments. For example, in some embodiments, the data in the performance tier may be written on a single-level cell (SLC) type of SSD, while the capacity tier may use a quad-level cell (QLC) type of SSD for storing the data. In some embodiments, each node 111 may include one or more disk groups with each disk group having one cache storage (e.g., one SSD 117) and one or more capacity storages (e.g., one or more magnetic disks and/or SSDs 118).

As further discussed below, each node 111 may include a storage management module (referred to herein as a "vSAN module") in order to automate storage management workflows (e.g., create objects in the object store, etc.) and provide access to objects in the object store (e.g., handle I/O operations on objects in the object store, etc.) based on predefined storage policies specified for objects in the object store. For example, because a VM may be initially configured by an administrator to have specific storage requirements (or policy) for its "virtual disk" depending on its intended use (e.g., capacity, availability, performance or input/output operations per second (IOPS), etc.), the administrator may define a storage profile or policy for each VM specifying such availability, capacity, performance and the like. As further described below, the vSAN module may then create an "object" for the specified virtual disk by backing it with physical storage resources of the object store based on the defined storage policy, including complying with a dynamic fault tolerance policy as described herein.

A virtualization management platform 105 is associated with cluster 110 of nodes 111. Virtualization management platform 105 enables an administrator to manage the configuration and spawning of the VMs on the various nodes 111. As depicted in the embodiment of FIG. 1, each node 111 includes a virtualization layer or hypervisor 113, a vSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described below, each hypervisor 113, through its corresponding vSAN module 114, may provide access to storage resources located in hardware 119 (e.g., SSDs 117 and magnetic disks 118) for use as storage for storage objects, such as virtual disks (or portions thereof) and other related files that may be accessed by any VM 112 residing in any of nodes 111 in cluster 110.

In one embodiment, vSAN module 114 may be implemented as a "vSAN" device driver within hypervisor 113. In such an embodiment, vSAN module 114 may provide access to a conceptual "vSAN" 115 through which an administrator can create a number of top-level "device" or namespace objects that are backed by object store 116, including specifying dynamic fault tolerance policies as described herein. For example, during creation of a device object, the administrator may specify a particular file system for the device object (such device objects may also be referred to as "file system objects" hereinafter) such that, during a boot process, each hypervisor 113 in each node 111 may discover a /vsan/ root node for a conceptual global namespace that is exposed by vSAN module 114. By accessing APIs exposed by vSAN module 114, hypervisor 113 may then determine all the top-level file system objects (or other types of top-level device objects) currently residing in vSAN 115.

When a VM (or other client) attempts to access one of the file system objects, hypervisor 113 may then dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through vSAN 115 may, for example, be implemented to emulate the semantics of a particular file system, such as a distributed (or clustered) virtual machine file system (VMFS) provided by VMware Inc. VMFS is designed to provide concurrency control among simultaneously accessing VMs. Because vSAN 115 supports multiple file system objects, it is able to provide storage resources through object store 116 without being confined by limitations of any particular clustered file system. For example, many clustered file systems may only scale to support a certain amount of nodes 111. By providing multiple top-level file system object support, vSAN 115 may overcome the scalability limitations of such clustered file systems.

As described in further detail in the context of FIG. 2 below, a file system object may, itself, provide access to a number of virtual disk descriptor files accessible by VMs 112 running in cluster 110. These virtual disk descriptor files may contain references to virtual disk "objects" that contain the actual data for the virtual disk and are separately backed by object store 116. A virtual disk object may itself be a hierarchical, "composite" object that is further composed of "components" (again separately backed by object store 116) that reflect the storage requirements (e.g., capacity, availability, IOPs, etc.) of a corresponding storage profile or policy generated by the administrator when initially creating the virtual disk. Each vSAN module 114 (through a cluster level object management or "CLOM" sub-module, in embodiments as further described below) may communicate with other vSAN modules 114 of other nodes 111 to create and maintain an in-memory metadata database (e.g., maintained separately but in synchronized fashion in the memory of each node 111) that may contain metadata describing the locations, configurations, policies and relationships among the various objects stored in object store 116.

This in-memory metadata database is utilized by a vSAN module 114 on a node 111, for example, when a user (e.g., an administrator) first creates a virtual disk for a VM as well as when the VM is running and performing I/O operations (e.g., read or write) on the virtual disk. vSAN module 114 (through a distributed object manager or "DOM" sub-module), in some embodiments, may traverse a hierarchy of objects using the metadata in the in-memory database in order to properly route an I/O operation request to the node (or nodes) that houses (house) the actual physical local storage that backs the portion of the virtual disk that is subject to the I/O operation.

In some embodiments, one or more nodes 111 of node cluster 110 may be located at a geographical site that is distinct from the geographical site where the rest of nodes 111 are located. For example, some nodes 111 of node cluster 110 may be located at building A while other nodes may be located at building B. In another example, the geographical sites may be more remote such that one geographical site is located in one city or country and the other geographical site is located in another city or country. In such embodiments, any communications (e.g., I/O operations) between the DOM sub-module of a node at one geographical site and the DOM sub-module of a node at the other remote geographical site may be performed through a network, such as a wide area network ("WAN").

Figure 2:
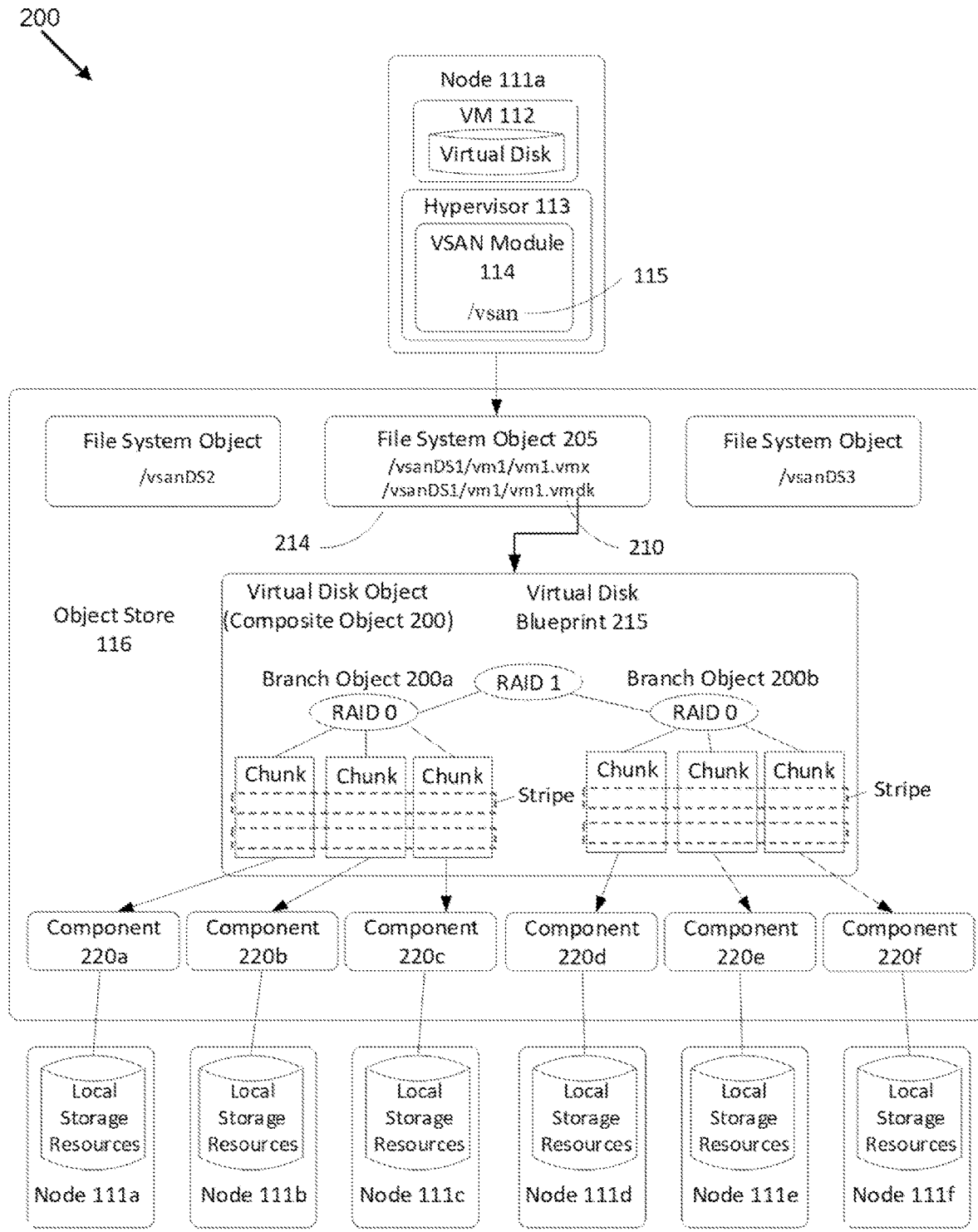
FIG. 2 is a diagram illustrating an example hierarchical structure of objects organized within an object store that represent a virtual disk, according to an example embodiment of the present application.

FIG. 2 is a diagram 200 illustrating an example hierarchical structure of objects organized within an object store 116 that represent a virtual disk, according to an example embodiment of the present application. As previously discussed above, a VM 112 running on one of nodes 111 may perform I/O operations on a virtual disk that is stored as a hierarchical composite object 200 in object store 116. Hypervisor 113 may provide VM 112 access to the virtual disk by interfacing with the abstraction of vSAN 115 through vSAN module 114 (e.g., by auto-mounting the top-level file system object 214 corresponding to the virtual disk object 200). For example, vSAN module 114, by querying its local copy of the in-memory metadata database, may be able to identify a particular file system object 205 (e.g., a VMFS file system object in one embodiment, etc.) stored in vSAN 115 that may store a descriptor file 210 for the virtual disk.

Descriptor file 210 may include a reference to composite object 200 that is separately stored in object store 116 and conceptually represents the virtual disk (and thus may also be sometimes referenced herein as a virtual disk object). Composite object 200 may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk. For example, composite object 200 may store a dynamic fault tolerance policy that specifies how a number of HFT for composite object 200 is to be determined.

Depending on the desired storage policy (e.g., desired level of performance efficiency, HFT, and the like), a virtual disk blueprint 215 may direct data corresponding to composite object 200 to be stored in the datastore in a variety of ways. As described, the storage policy may be used to determine an HFT and/or stripe width (SW) associated with an object. FIG. 2 shows (composite) object 200 that includes a virtual disk blueprint 215 describing a RAID 1 configuration where two mirrored copies of the virtual disk (e.g., mirrors) are each further striped in a RAID 0 configuration. In an example, the storage policy for virtual disk file 200 specifies a stripe width of three (SW=3) and a dynamic fault tolerance policy that, when evaluated, results in an HFT of one (HFT=1). Branch objects 200a and 200b represent replicas of the same object. Dynamic fault tolerance policies are described in more detail below with respect to FIGS. 3-6.

Data striping, in some embodiments, may refer to segmenting logically sequential data, such as a virtual disk. Each stripe may contain a plurality of data blocks. In some cases, each stripe may also include one or more code blocks (e.g., in the case of RAID 5 or RAID 6). As shown, the stripes are split vertically into different groups of blocks, referred to as chunks, where each chunk is logically represented as a "leaf" or "component" to which composite object 200 may contain a reference.

The metadata accessible by vSAN module 114 in the in-memory metadata database for each component 220 provides a mapping to or otherwise identifies a particular node 111 in cluster 110 that houses the physical storage resources (e.g., magnetic disks or slower/cheaper SSD 118, etc.) that actually store the chunk (as well as the location of the chunk within such physical resource).

In certain embodiments, vSAN module 114 may execute as a device driver exposing an abstraction of a vSAN 115 to hypervisor 113. Various sub-modules of vSAN module 114 handle different responsibilities and may operate within either user space or kernel space depending on such responsibilities. In some embodiments, vSAN module 114 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), vSAN module 114 may also be accessed (e.g., to dynamically revise or otherwise update a virtual disk blueprint or the mappings of the virtual disk blueprint to actual physical storage in object store 116) based on a change made by a user to the storage profile or policy relating to an object, when changes to the cluster or workload result in an object being out of compliance with a current storage profile or policy, or when changes to the cluster or workload cause re-evaluation of a dynamic fault tolerance policy.

In one embodiment, if a user creates a storage profile or policy for a composite object such as virtual disk object 200, vSAN module 114 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/chunks of the virtual disk to achieve load balancing, etc.). For example, vSAN module 114, in one embodiment, may be responsible for generating blueprint 215 describing the RAID 1/RAID 0 configuration for virtual disk object 200 in FIG. 2 when the virtual disk was first created by the user. As previously discussed, a storage policy may specify requirements for capacity, IOPS, availability, and reliability. Storage policies may also specify a workload characterization (e.g., random or sequential access, I/O request size, cache size, expected cache hit ration, etc.).

Additionally, the user may also specify an affinity to vSAN module 114 to preferentially use certain nodes 111 (or the local disks housed therein). For example, when provisioning a new virtual disk for a VM, a user may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, vSAN module 114 may consult the in-memory metadata database to determine the current state of cluster 110 in order to generate a virtual disk blueprint for a composite object (e.g., the virtual disk object) that suits the generated storage policy. As further discussed below, vSAN module 114 may interact with object store 116 to implement the blueprint by, for example, allocating or otherwise mapping components (e.g., chunks) of the composite object to physical storage locations within various nodes 111 of cluster 110.

In some embodiments, vSAN module 114 may also include a cluster monitoring, membership, and directory services (CMMDS) sub-module that maintains the previously discussed in-memory metadata database to provide information on the state of cluster 110 to other sub-modules of vSAN module 114 and also tracks the general "health" of cluster 110 by monitoring the status, accessibility, and visibility of each node 111 in cluster 110. The in-memory metadata database may serve as a directory service that maintains a physical inventory of the vSAN environment, such as the various nodes 111, the storage resources in the nodes 111 (SSD, NVMe drives, magnetic disks, etc.) housed therein and the characteristics/capabilities thereof, the current state of the nodes 111 and their corresponding storage resources, network paths among the nodes 111, and the like.

As previously discussed, in addition to maintaining a physical inventory, the in-memory metadata database may further provide a catalog of metadata for objects stored in object store 116 (e.g., what composite and components exist, what components belong to what composite objects, which nodes serve as "coordinators" or "owners" that control access to which objects, quality of service requirements for each object, object configurations, the mapping of objects to physical storage locations, etc.). As previously discussed, sub-modules within vSAN module 114 may access the CMMDS sub-module for updates to learn of changes in cluster topology and object configurations.

In some cases, one or more nodes 111 within node cluster 110 may fail or go offline, resulting in a loss of the data and/or code blocks stored by such nodes. In such cases, the distributed storage system or vSAN environment 100 may have to be able to tolerate such a failure and efficiently reconstruct the missing data blocks. In some other cases, a node 111 may go offline temporarily and then come back online resulting in some out-of-sync data blocks. To address such cases, the distributed storage system may be configured with fault tolerance technologies to resync such out-of-sync data and/or code blocks. Accordingly, to increase performance efficiency and fault tolerance, distributed storage systems (e.g., vSAN environment 100) may implement a variety of fault tolerance technologies, such as the various levels of RAID and/or erasure coding, etc. As described above, depending on the required level of performance and fault tolerance (e.g., based on a dynamic fault tolerance policy), virtual disk blueprint 215 may direct composite object 200 to be distributed in one of several ways. In some embodiments, one or a combination of RAID levels (e.g. RAID 0 to RAID 6) may be used, where each RAID level or a combination thereof may provide a different level of fault tolerance and performance enhancement.

For example, FIG. 2 illustrates an example of the application of RAID 1, which entails creating a replica of composite object 200. This is to ensure that a second copy (e.g., branch object 200b) of composite object 200 is still available if a first copy (e.g., branch object 200a) is lost due to some sort of failure (e.g. disk failure etc.). In some embodiments, some objects may require a more robust fault tolerance system (e.g., depending on their level of importance). For example, in one embodiment, the vSAN datastore may store the metadata object (in the performance tier) in a three-way mirror format (e.g., on at least three different disks).

In addition to RAID 1, FIG. 2 also illustrates the application of RAID 0 to the two copies of composite object 200 (branch object 200a and branch object 200b, created as a result of RAID 1). Under RAID 0, each copy of composite object 200 may be partitioned into smaller data stripes, where each stripe is further segmented into a number of data blocks (e.g., DB1, DB2, DB3, in the first stripe, and DB4, DB5, DB6, in the second stripe, with reference to FIG. 4) and distributed across local storage resources of various nodes in the datastore. In some cases, striping a copy of composite object 200 over local storage resources of various nodes may enhance performance as compared to storing the entire copy of composite object 200 in a single node. This is because striping the data means that smaller amounts of data are written to or read from local storage resources of multiple nodes in parallel, thereby reducing the amount of time to complete a particular read or write operation. However, multiplying the number of nodes used to store the various chunks of data may increase the probability of failure, and thus data loss.

To achieve an even higher level of fault tolerance with much less space usage than RAID 1, erasure coding is applied in some embodiments. Erasure coding (EC) is a method of data protection in which each copy of composite object 200 is partitioned into stripes, expanded and encoded with redundant data pieces, and stored across different nodes of the datastore. For example, a copy of composite object 200 is organized or partitioned into stripes, each of which is broken up into N equal-sized data blocks. Erasure codes are then used to encode an additional M equal-sized code block(s) (interchangeably referred to as "parity blocks") from the original N data blocks, where N is a larger number than M.

The M equal-sized code block(s) then provide fault tolerance and enable reconstruction of one or more lost data blocks in the same stripe should one or more of the underlying nodes fail. More specifically, each code block includes parity values computed from the N data blocks in the same stripe using an erasure coding algorithm. An application of an exclusive OR (i.e., XOR) operation to the N data blocks of the stripe, for computing a code block, is one example of applying an erasure coding algorithm, in which case the computed code block contains the XOR of data corresponding to the N data blocks in the stripe. In such an example, if one of the N data blocks is lost due a failure of its underlying node, the datastore object may be able to be reconstructed by performing an XOR operation of the remaining data blocks as well as the computed code block(s) in the same stripe. Depending on the level of fault tolerance desired, different erasure codes are applied in creating the one or more M code blocks. RAID 5 and RAID 6 are common examples of applying erasure coding. In RAID 5, an exclusive OR (i.e. XOR) operation is performed on multiple data blocks to compute a single parity block.

FIG. 3 is an illustration of a dynamic fault tolerance policy 310, according to an example embodiment of the present application.

Dynamic fault tolerance policy 310 specifies a manner of determining an HFT for a storage object as a function of a number n of fault domains in a storage cluster with sufficient capacity for creation of the storage object.

When the storage object is created by applying dynamic fault tolerance policy 310, before object creation, the HFT is calculated using the resources of the vSAN cluster, and then the object is created with the calculated HFT. The resources of a vSAN cluster are determined based on how many fault domains there are within a vSAN cluster, and further based on whether each fault domain has sufficient disk capacity for creating the disk object. Hosts in maintenance mode cannot contribute capacity, so it is also determined whether hosts in each fault domain are in maintenance mode. Information about numbers, states, and capacities of hosts within fault domains may be determined from the in-memory metadata database of vSAN module 114 described above with respect to FIG. 2.

According to dynamic fault tolerance policy 310, the HFT is 0 if n =0. Dynamic fault tolerance policy 310 further specifies that if n falls between 0 and 7, then the HFT is equal to (n−1)/2 (e.g., truncating any numbers after a decimal point). For instance, if n=3, then the HFT would be 1. Likewise, if n=5, then the HFT would be 2. Finally, dynamic fault tolerance policy 310 specifies that if n is 7 or higher, then the HFT is 3. For example, there may be diminishing returns for increasing HFT above 3 due to the large amount of resources that would be required and the small likelihood of three host failures occurring simultaneously. Dynamic fault tolerance policy 310 is one example of a dynamic fault tolerance policy, and different formulas, variables, and/or techniques for determining HFT may be specified in a dynamic fault tolerance policy.

Dynamic fault tolerance policy 310 is applied when each associated storage object is first created, and may be re-evaluated on an ongoing basis, as changes occur in the cluster, etc. For example, when the system status changes (e.g., hosts are added to and removed from the cluster, fault domains are configured, disk space is added or removed, hosts enter maintenance mode, etc.), HFT is automatically recalculated and reconfigured as needed for the objects associated with dynamic fault tolerance policy 310 according to the latest resources of the vSAN cluster.

Dynamic fault tolerance policy 310 may be added to a storage profile by a user and specified as the applicable policy for one or more objects and/or as a default policy. Dynamic fault tolerance policy 310 is then automatically implemented for all associated objects.

FIG. 4 is a diagram 400 illustrating application of a dynamic fault tolerance policy in response to certain events, according to an example embodiment of the present application. For instance, diagram 400 may represent the application of dynamic fault tolerance policy 310 of FIG. 3 as changes occur in a storage cluster.

In the system illustrated by diagram 400, initially there is a vSAN cluster with 3 hosts with one or more disk groups being configured with the resources of each host, and there is a metadata object created in the cluster. A disk group is a construct in a storage cluster that allows resources of a host to be added to the capacity of the storage cluster, and generally comprises a type of container for organizing storage resources of a host into units. A host with one or more disk groups configures contributes resources to the cluster, while a host with no disk groups configured does not contribute any resources to the cluster. In the present case, initially each host is its own fault domain (e.g., because fault domains are not explicitly specified or because each host is configured to be its own fault domain).

First, 2 hosts are added to the cluster. At this point, there are 5 fault domains, 3 of which have sufficient capacity for creating the object because the storage resources of the 2 newly added hosts have not yet been added to the cluster's shared resources (e.g., a disk group has not yet been configured with the resources of the newly added hosts). As such, applying dynamic fault tolerance policy 310 of FIG. 3, the HFT of the object is determined to be 1 (e.g., (3−1)/2=1).

Next, the resources of the newly added hosts are included in the cluster, such as by configuring a disk group with the resources of the newly added hosts. At this point, there are 5 fault domains, all 5 of which have sufficient capacity for creating the object. As such, applying dynamic fault tolerance policy 310 of FIG. 3, the HFT of the object is determined to be 2 (e.g., (5−1)/2=2).

Next, 2 more hosts are added to the cluster. At this point, there are 7 fault domains, 5 of which have sufficient capacity for creating the object because the storage resources of the 2 newly added hosts have not yet been added to the cluster's shared resources. As such, applying dynamic fault tolerance policy 310 of FIG. 3, the HFT of the object is determined to be 2 (e.g., (5−1)/2=2).

Next, the resources of the newly added hosts are included in the cluster, such as by configuring a disk group with the resources of the newly added hosts. At this point, there are 7 fault domains, all 7 of which have sufficient capacity for creating the object. As such, applying dynamic fault tolerance policy 310 of FIG. 3, the HFT of the object is determined to be 3 (e.g., because n is greater than or equal to 7).

Next, the 7 hosts are configured into 3 different fault domains. For example, the 7 hosts that were previously 7 individual fault domains may be grouped into fault domains based on one or more characteristics, such as rack colocation, resulting in 3 total fault domains. At this point, there are 3 fault domains, all 3 of which have sufficient capacity for creating the object. As such, applying dynamic fault tolerance policy 310 of FIG. 3, the HFT of the object is determined to be 1 (e.g., (3−1)/2=1).

Next, the above fault domain configuration is cleared, returning to the state where each of the 7 hosts is its own fault domain. At this point, there are again 7 fault domains, all 7 of which have sufficient capacity for creating the object. As such, applying dynamic fault tolerance policy 310 of FIG. 3, the HFT of the object is determined to be 3 (e.g., because n is greater than or equal to 7).

Next, resources of one host are removed from the cluster, such as by removing the resources of the host from a disk group. At this point, there are 7 fault domains, 6 of which have sufficient capacity for creating the object. As such, applying dynamic fault tolerance policy 310 of FIG. 3, the HFT of the object is determined to be 2 (e.g., (6−1) /2=2.5, which is 2 after truncating the numbers after the decimal point).

Next, the above host (the resources of which were removed from the cluster) enters maintenance mode, resulting in the host no longer being considered as part of the cluster's resources. At this point, there are 6 fault domains, all 6 of which have sufficient capacity for creating the object. As such, applying dynamic fault tolerance policy 310 of FIG. 3, the HFT of the object is determined to be 2 (e.g., (6−1) /2=2.5, which is 2 after truncating the numbers after the decimal point).

Next, another host enters maintenance mode, resulting in the host no longer being considered as part of the cluster's resources. At this point, there are 5 fault domains, all 5 of which have sufficient capacity for creating the object. As such, applying dynamic fault tolerance policy 310 of FIG. 3, the HFT of the object is determined to be 2 (e.g., (5−1)/2=2).

Next, another host enters maintenance mode, resulting in the host no longer being considered as part of the cluster's resources. At this point, there are 4 fault domains, all 4 of which have sufficient capacity for creating the object. As such, applying dynamic fault tolerance policy 310 of FIG. 3, the HFT of the object is determined to be 1 (e.g., (4−1) /2=1.5, which is 1 after truncating the numbers after the decimal point).

Next, another host enters maintenance mode, resulting in the host no longer being considered as part of the cluster's resources. At this point, there are 3 fault domains, all 3 of which have sufficient capacity for creating the object. As such, applying dynamic fault tolerance policy 310 of FIG. 3, the HFT of the object is determined to be 1 (e.g., (3−1)/2=1).

Next, another host enters maintenance mode, resulting in the host no longer being considered as part of the cluster's resources. At this point, there are 2 fault domains, both of which have sufficient capacity for creating the object. As such, applying dynamic fault tolerance policy 310 of FIG. 3, the HFT of the object is determined to be 0 (e.g., (2−1)/ 2=0.5, which is 0 after truncating the numbers after the decimal point).

Next, another host enters maintenance mode, resulting in the host no longer being considered as part of the cluster's resources. At this point, there is 1 fault domains, and the 1 fault domain has sufficient capacity for creating the object. As such, applying dynamic fault tolerance policy 310 of FIG. 3, the HFT of the object is determined to be 0 (e.g., (1−1)/2=0).

Figure 5:
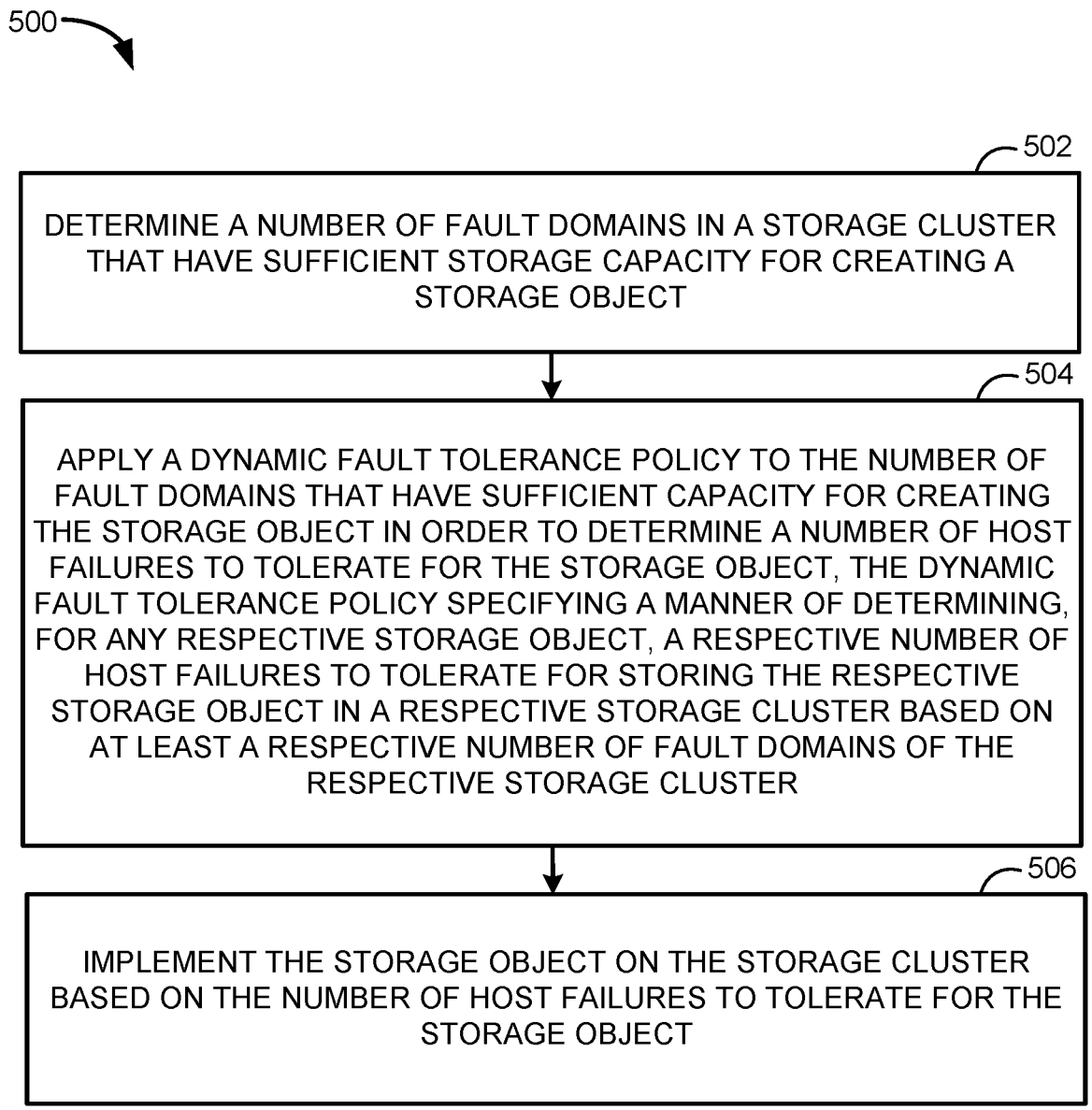
FIG. 5 illustrates example operations for dynamic storage object configuration, according to an example embodiment of the present application.

FIG. 5 is a flowchart illustrating example operations 500 for dynamic storage object configuration, according to an example embodiment of the present application. Operations 500 may be performed, for example, by vSAN module 114, as described above with reference to FIGS. 1 and 2. In certain other embodiments, the operations may be performed by some other modules that reside in the hypervisor or outside of the hypervisor of a host machine.

At 502, a number of fault domains in a storage cluster that have sufficient storage capacity for creating a storage object is determined. For example, based on a dynamic fault tolerance policy, vSAN module 114 of FIGS. 1 and 2 may consult with an in-memory metadata database to determine current host capacities in a storage cluster. Determining the number of fault domains in the storage cluster that have sufficient storage capacity for creating the storage object may also include determining whether any hosts in the storage cluster are in a maintenance mode.

At 504, a dynamic fault tolerance policy is applied to the number of fault domains that have sufficient capacity for creating the storage object in order to determine a number of host failures to tolerate for the storage object. The dynamic fault tolerance policy specifies a manner of determining, for any respective storage object, a respective number of host failures to tolerate for storing the respective storage object in a respective storage cluster based on at least a respective number of fault domains of the respective storage cluster. In one example, vSAN module 114 of FIGS. 1 and 2 may calculate the HFT for the storage object by utilizing one or more formulas or techniques identified in dynamic fault tolerance policy 310 of FIG. 3, which may define HFT as a function of the number of fault domains that have sufficient capacity for creating the storage object.

At 506, the storage object is implemented on the storage cluster based on the number of host failures to tolerate for the storage object. For example, zero or more replicas of the storage object may be created on the storage cluster such that the number of HFT will be tolerated.

Figure 6:
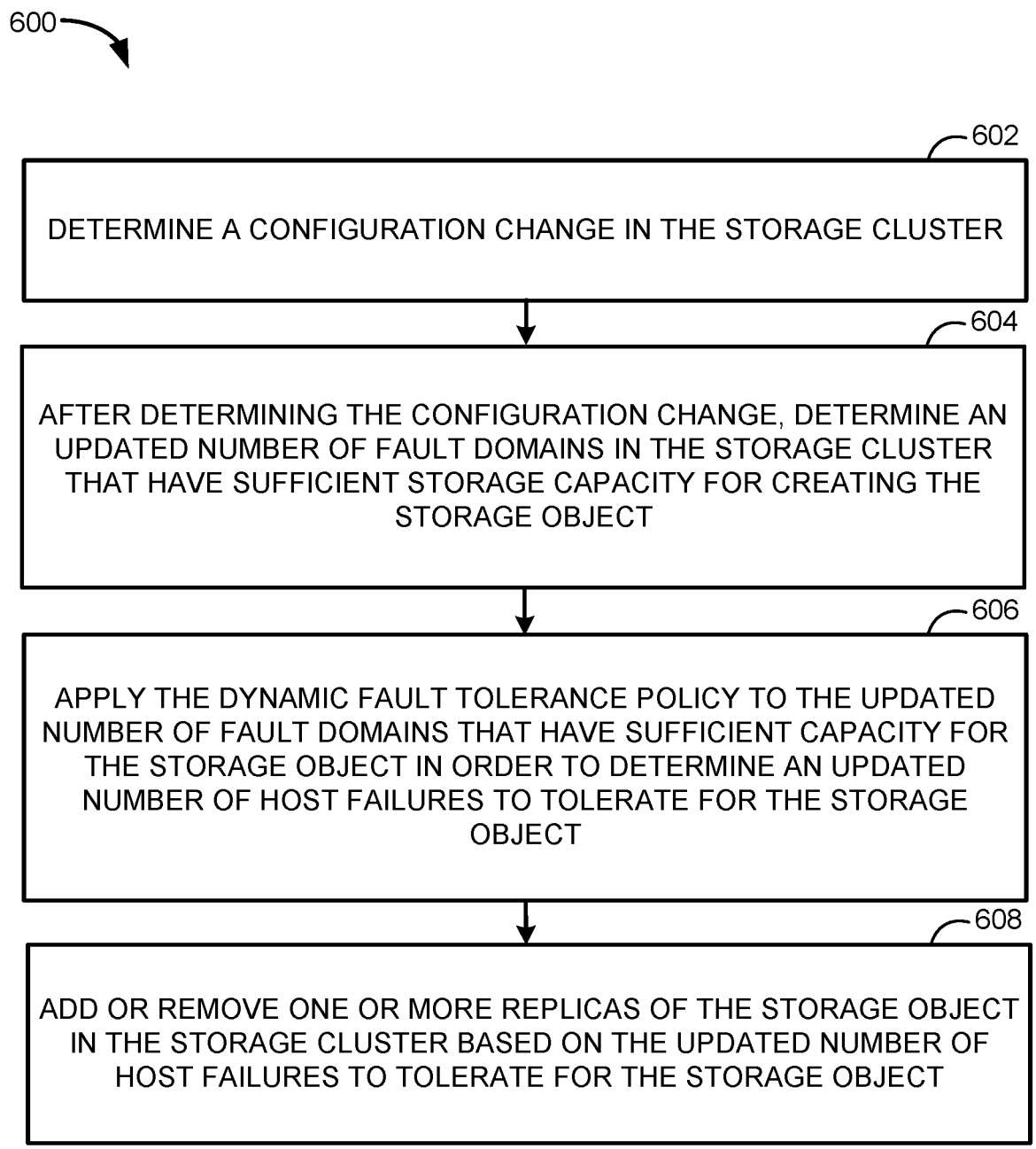
FIG. 6 illustrates additional example operations for dynamic storage object configuration, according to an example embodiment of the present application.

FIG. 6 is a flowchart illustrating additional example operations 600 for dynamic storage object configuration, according to an example embodiment of the present application. Operations 600 may be performed after operations 500 of FIG. 5, for example, by vSAN module 114, as described above with reference to FIGS. 1 and 2. In certain other embodiments, the operations may be performed by some other modules that reside in the hypervisor or outside of the hypervisor of a host machine.

At 602, a configuration change is determined in the storage cluster. For example, vSAN module 114 of FIGS. 1 and 2 may monitor for events in the storage cluster. Determining the configuration change may include, for example, determining that a host has been added to the storage cluster, determining that a host has been removed from the storage cluster, determining that a host in the storage cluster has entered a maintenance mode, determining that a host in the storage cluster has exited maintenance mode, determining a fault domain configuration change, or determining that a storage capacity of a fault domain in the storage cluster has changed.

At 604, after determining the configuration change, an updated number of fault domains in the storage cluster that have sufficient storage capacity for the storage object is determined. For example, vSAN module 114 of FIGS. 1 and 2 may consult with an in-memory metadata database to determine current host capacities in the storage cluster following the configuration change.

At 606, the dynamic fault tolerance policy is applied to the updated number of fault domains that have sufficient capacity for the storage object in order to determine an updated number of host failures to tolerate for the storage object. For example, vSAN module 114 of FIGS. 1 and 2 may calculate the updated HFT for the storage object by utilizing the one or more formulas or techniques identified in dynamic fault toleration policy 310 of FIGS. 3, which may define HFT as a function of the number of fault domains that have sufficient capacity for the storage object.

At 608, one or more replicas of the storage object are added or removed in the storage cluster based on the updated number of host failures to tolerate for the storage object.

Techniques described herein overcome technical problems associated with conventional techniques for storage configuration. For example, existing manual reconfiguration techniques do not scale well in larger data centers and may result in sub-optimal fault tolerance configurations that under-utilize or over-utilize available resources in a cluster. Furthermore, existing configuration techniques may not allow a user to select optimal fault tolerance configurations for some objects that are not exposed to the user, such as metadata objects used to store certain configuration and domain information. Embodiments of the present disclosure constitute a technical solution to these problems by allowing dynamic fault tolerance policies to be defined and automatically applied based on real-time conditions in a storage cluster, and may be applied even to objects that are not exposed to the user so that the fault tolerance configurations of these objects are optimized based on changing conditions without the user needing to have access to information about the objects.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for dynamic storage object configuration in a datacenter, comprising:
   determining a number of fault domains in a storage cluster that have sufficient storage capacity for creating a storage object;
   applying a dynamic fault tolerance policy to the number of fault domains that have sufficient capacity for creating the storage object in order to determine a number of host failures to tolerate for the storage object, the dynamic fault tolerance policy specifying a manner of determining, for any respective storage object, a respective number of host failures to tolerate for storing the respective storage object in a respective storage cluster based on at least a respective number of fault domains of the respective storage cluster; and
   implementing the storage object on the storage cluster based on the number of host failures to tolerate for the storage object.

2. The method of claim 1, wherein implementing the storage object on the storage cluster based on the number of host failures to tolerate for the storage object comprises creating one or more replicas of the storage object in the storage cluster based on the number of host failures to tolerate for the storage object.

3. The method of claim 1, further comprising:
   determining a configuration change in the storage cluster;
   after determining the configuration change, determining an updated number of fault domains in the storage cluster that have sufficient storage capacity for the storage object; and
   applying the dynamic fault tolerance policy to the updated number of fault domains that have sufficient capacity for the storage object in order to determine an updated number of host failures to tolerate for the storage object.

4. The method of claim 3, further comprising adding or removing one or more replicas of the storage object in the storage cluster based on the updated number of host failures to tolerate for the storage object.

5. The method of claim 3, wherein determining the configuration change in the storage cluster comprises one or more of:
   determining that a host has been added to the storage cluster;
   determining that a host has been removed from the storage cluster;
   determining that a host in the storage cluster has entered a maintenance mode;
   determining that a host in the storage cluster has exited maintenance mode;
   determining a fault domain configuration change; or
   determining that a storage capacity of a fault domain in the storage cluster has changed.

6. The method of claim 1, wherein the dynamic fault tolerance policy is included in a storage profile created by a user of the datacenter.

7. The method of claim 1, wherein determining the number of fault domains in the storage cluster that have sufficient storage capacity for creating the storage object comprises determining whether each fault domain in the storage cluster includes one or more hosts in a maintenance mode.

8. A system for a non-disruptive system upgrade, comprising:
   at least one memory; and
   at least one processor coupled to the at least one memory, the at least one processor and the at least one memory configured to:
      determine a number of fault domains in a storage cluster that have sufficient storage capacity for creating a storage object;
      apply a dynamic fault tolerance policy to the number of fault domains that have sufficient capacity for creating the storage object in order to determine a number of host failures to tolerate for the storage object, the dynamic fault tolerance policy specifying a manner of determining, for any respective storage object, a respective number of host failures to tolerate for storing the respective storage object in a respective storage cluster based on at least a respective number of fault domains of the respective storage cluster; and
      implement the storage object on the storage cluster based on the number of host failures to tolerate for the storage object.

9. The system of claim 8, wherein implementing the storage object on the storage cluster based on the number of host failures to tolerate for the storage object comprises creating one or more replicas of the storage object in the storage cluster based on the number of host failures to tolerate for the storage object.

10. The system of claim 8, wherein the at least one processor and the at least one memory are further configured to:
    determine a configuration change in the storage cluster;
    after determining the configuration change, determine an updated number of fault domains in the storage cluster that have sufficient storage capacity for the storage object; and
    apply the dynamic fault tolerance policy to the updated number of fault domains that have sufficient capacity for the storage object in order to determine an updated number of host failures to tolerate for the storage object.

11. The system of claim 10, wherein the at least one processor and the at least one memory are further configured to add or remove one or more replicas of the storage object in the storage cluster based on the updated number of host failures to tolerate for the storage object.

12. The system of claim 10, wherein determining the configuration change in the storage cluster comprises one or more of:
    determining that a host has been added to the storage cluster;
    determining that a host has been removed from the storage cluster;
    determining that a host in the storage cluster has entered a maintenance mode;
    determining that a host in the storage cluster has exited maintenance mode;
    determining a fault domain configuration change; or
    determining that a storage capacity of a fault domain in the storage cluster has changed.

13. The system of claim 8, wherein the dynamic fault tolerance policy is included in a storage profile created by a user.

14. The system of claim 8, wherein determining the number of fault domains in the storage cluster that have sufficient storage capacity for creating the storage object comprises determining whether each fault domain in the storage cluster includes one or more hosts in a maintenance mode.

15. A non-transitory computer-readable medium storing instructions that, when executed by one or more processors, cause the one or more processors to:
   determine a number of fault domains in a storage cluster that have sufficient storage capacity for creating a storage object;
   apply a dynamic fault tolerance policy to the number of fault domains that have sufficient capacity for creating the storage object in order to determine a number of host failures to tolerate for the storage object, the dynamic fault tolerance policy specifying a manner of determining, for any respective storage object, a respective number of host failures to tolerate for storing the respective storage object in a respective storage cluster based on at least a respective number of fault domains of the respective storage cluster; and
   implement the storage object on the storage cluster based on the number of host failures to tolerate for the storage object.

16. The non-transitory computer-readable medium of claim 15, wherein implementing the storage object on the storage cluster based on the number of host failures to tolerate for the storage object comprises creating one or more replicas of the storage object in the storage cluster based on the number of host failures to tolerate for the storage object.

17. The non-transitory computer-readable medium of claim 15, wherein the instructions, when executed by the one or more processors, further cause the one or more processors to:
   determine a configuration change in the storage cluster;
   after determining the configuration change, determine an updated number of fault domains in the storage cluster that have sufficient storage capacity for the storage object; and
   apply the dynamic fault tolerance policy to the updated number of fault domains that have sufficient capacity for the storage object in order to determine an updated number of host failures to tolerate for the storage object.

18. The non-transitory computer-readable medium of claim 17, wherein the instructions, when executed by the one or more processors, further cause the one or more processors to add or remove one or more replicas of the storage object in the storage cluster based on the updated number of host failures to tolerate for the storage object.

19. The non-transitory computer-readable medium of claim 17, wherein determining the configuration change in the storage cluster comprises one or more of:
   determining that a host has been added to the storage cluster;
   determining that a host has been removed from the storage cluster;
   determining that a host in the storage cluster has entered a maintenance mode;
   determining that a host in the storage cluster has exited maintenance mode;
   determining a fault domain configuration change; or
   determining that a storage capacity of a fault domain in the storage cluster has changed.

20. The non-transitory computer-readable medium of claim 15, wherein the dynamic fault tolerance policy is included in a storage profile created by a user.

* * * * *